US009603351B1

(12) United States Patent
Terrell

(10) Patent No.: US 9,603,351 B1
(45) Date of Patent: *Mar. 28, 2017

(54) ECOFRIENDLY MARITIME PEST MANAGEMENT KIT

(71) Applicant: Ty Terrell, Plantation, FL (US)

(72) Inventor: Ty Terrell, Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,339

(22) Filed: Dec. 9, 2015

Related U.S. Application Data

(62) Division of application No. 13/851,670, filed on Mar. 27, 2013, now Pat. No. 9,210,924.
(60) Provisional application No. 61/615,980, filed on Mar. 27, 2012.

(51) Int. Cl.
*A01M 23/24* (2006.01)
*A01M 23/30* (2006.01)

(52) U.S. Cl.
CPC ............ *A01M 23/24* (2013.01); *A01M 23/30* (2013.01)

(58) Field of Classification Search
CPC ...... A01M 23/24; A01M 23/26; A01M 23/30; A01M 23/00
USPC ..... 43/81, 81.5, 82, 83, 83.5, 88, 90, 92, 93
See application file for complete search history.

(56) References Cited

U.S. PATENT DOCUMENTS

| | | | | |
|---|---|---|---|---|
| 2,068,492 A | * | 1/1937 | Johnson | A01M 23/30 43/83 |
| 2,321,617 A | * | 6/1943 | Peterson | A01M 23/30 43/83.5 |
| 2,428,721 A | * | 10/1947 | Peterson | A01M 23/30 43/83.5 |
| 2,724,209 A | * | 11/1955 | Cain | A01M 23/30 43/83.5 |
| 2,778,149 A | * | 1/1957 | Edwards | A01M 23/30 43/83.5 |
| 3,295,246 A | * | 1/1967 | Landsman | A01M 1/2055 424/411 |
| 3,767,785 A | * | 10/1973 | Bordenca | C07C 43/196 2/171.2 |
| 3,864,867 A | * | 2/1975 | Dry | A01M 1/14 43/131 |
| 3,896,995 A | * | 7/1975 | Lelicoff | A01M 1/2044 239/36 |

(Continued)

*Primary Examiner* — Darren W Ark
(74) *Attorney, Agent, or Firm* — Nancy J. Flint, Esq.; Nancy J. Flint, Attorney At Law, P.A.

(57) ABSTRACT

An ecofriendly maritime pest management provides a compartmentalized and portable container for transporting an eclectic assortment of pest management devices insecticides, and baits. The ecofriendly maritime pest management kit has many novel features that enhance the capabilities to transport and compartmentalize pest management devices and nontoxic baits, and are useful for use on a maritime vessel on the ocean. The pest management devices and nontoxic baits articles are segregated into different compartments and color coded for quick access. The ecofriendly maritime pest management kit includes a mechanical pest entrapment device, a gimbally mounted container for containing a predetermined quantity of nontoxic insecticide, an insect repellant delivery device, an insect repellant solid composition, and a container for the insect repellant solid composition. The exterior pouches provides the option of carrying bait, sanitation gels, paper towels, contact information, medicine, or other articles beneficial for the management of pests on a maritime vessel.

6 Claims, 18 Drawing Sheets

(56) References Cited

U.S. PATENT DOCUMENTS

| | | | |
|---|---|---|---|
| 4,215,508 A * | 8/1980 | Allen | A01M 17/008 206/0.5 |
| 4,364,194 A * | 12/1982 | Clark, Sr. | A01M 25/004 43/121 |
| 4,597,218 A * | 7/1986 | Friemel | A01M 1/2055 428/198 |
| 4,619,071 A * | 10/1986 | Willis | A01M 25/004 43/124 |
| 4,665,644 A * | 5/1987 | Vajs | A01M 23/30 43/82 |
| 4,769,943 A * | 9/1988 | Simpson | A01M 29/12 43/107 |
| 4,803,799 A * | 2/1989 | Vajs | A01M 23/30 43/82 |
| 4,804,142 A * | 2/1989 | Riley | A01M 29/12 239/56 |
| 5,337,512 A * | 8/1994 | Krenzler | A01M 23/30 43/81 |
| 5,930,944 A * | 8/1999 | Knuppel | A01M 1/026 43/114 |
| 6,047,494 A * | 4/2000 | Johnson | A01M 23/005 206/594 |
| 6,164,010 A * | 12/2000 | Snell | A01M 1/026 43/114 |
| 6,202,339 B1 * | 3/2001 | Knuppel | A01M 1/026 43/114 |
| 6,266,917 B1 * | 7/2001 | Hight | A01M 1/103 43/114 |
| 6,389,738 B1 * | 5/2002 | Denny | A01M 1/2011 43/58 |
| 6,397,517 B1 * | 6/2002 | Leyerle | A01M 23/24 43/131 |
| 6,415,544 B1 * | 7/2002 | Leyerle | A01M 23/24 43/82 |
| 6,419,943 B1 * | 7/2002 | Sakurada | A01M 1/02 424/409 |
| 6,508,031 B1 * | 1/2003 | Johnson | A01M 23/30 43/83.5 |
| 6,574,912 B1 * | 6/2003 | Johnson | A01M 23/30 43/58 |
| 6,618,983 B1 * | 9/2003 | Spragins | A01M 1/14 43/107 |
| 6,874,274 B2 * | 4/2005 | Townsend | A01M 25/004 43/107 |
| 7,380,370 B2 * | 6/2008 | Livingston | A01M 29/12 239/47 |
| 7,814,702 B2 * | 10/2010 | Nathan | A01M 23/24 43/69 |
| 7,980,023 B2 * | 7/2011 | Nelson | A01M 25/004 43/114 |
| 7,988,984 B2 * | 8/2011 | Hockaday | A01M 1/02 119/654 |
| 8,302,345 B2 * | 11/2012 | Nelson | A01M 25/004 43/114 |
| 8,387,304 B2 * | 3/2013 | Cink | A01M 25/004 43/131 |
| 8,490,322 B2 * | 7/2013 | Dobias | A01M 23/30 43/81 |
| 9,210,924 B1 * | 12/2015 | Terrell | A01M 23/26 |
| 2004/0170544 A1 * | 9/2004 | Ettlinger | A61L 2/22 422/292 |
| 2005/0246943 A1 * | 11/2005 | Neumann | A01M 1/2055 43/132.1 |
| 2006/0053682 A1 * | 3/2006 | Goldstein | A01M 1/10 43/67 |
| 2009/0020625 A1 * | 1/2009 | Trevino | A61L 9/127 239/44 |
| 2010/0319238 A1 * | 12/2010 | Cink | A01M 25/004 43/58 |
| 2011/0035988 A1 * | 2/2011 | Mountzoures | A01M 29/12 43/124 |
| 2012/0061486 A1 * | 3/2012 | Atkinson | A61L 9/127 239/34 |
| 2012/0280055 A1 * | 11/2012 | Schneidmiller | A01M 1/02 239/6 |
| 2013/0333273 A1 * | 12/2013 | Esculier | A01M 23/02 43/58 |
| 2014/0202067 A1 * | 7/2014 | Dunham | A01M 29/06 43/131 |
| 2014/0290122 A1 * | 10/2014 | Vasudeva | A01M 1/023 43/58 |

\* cited by examiner

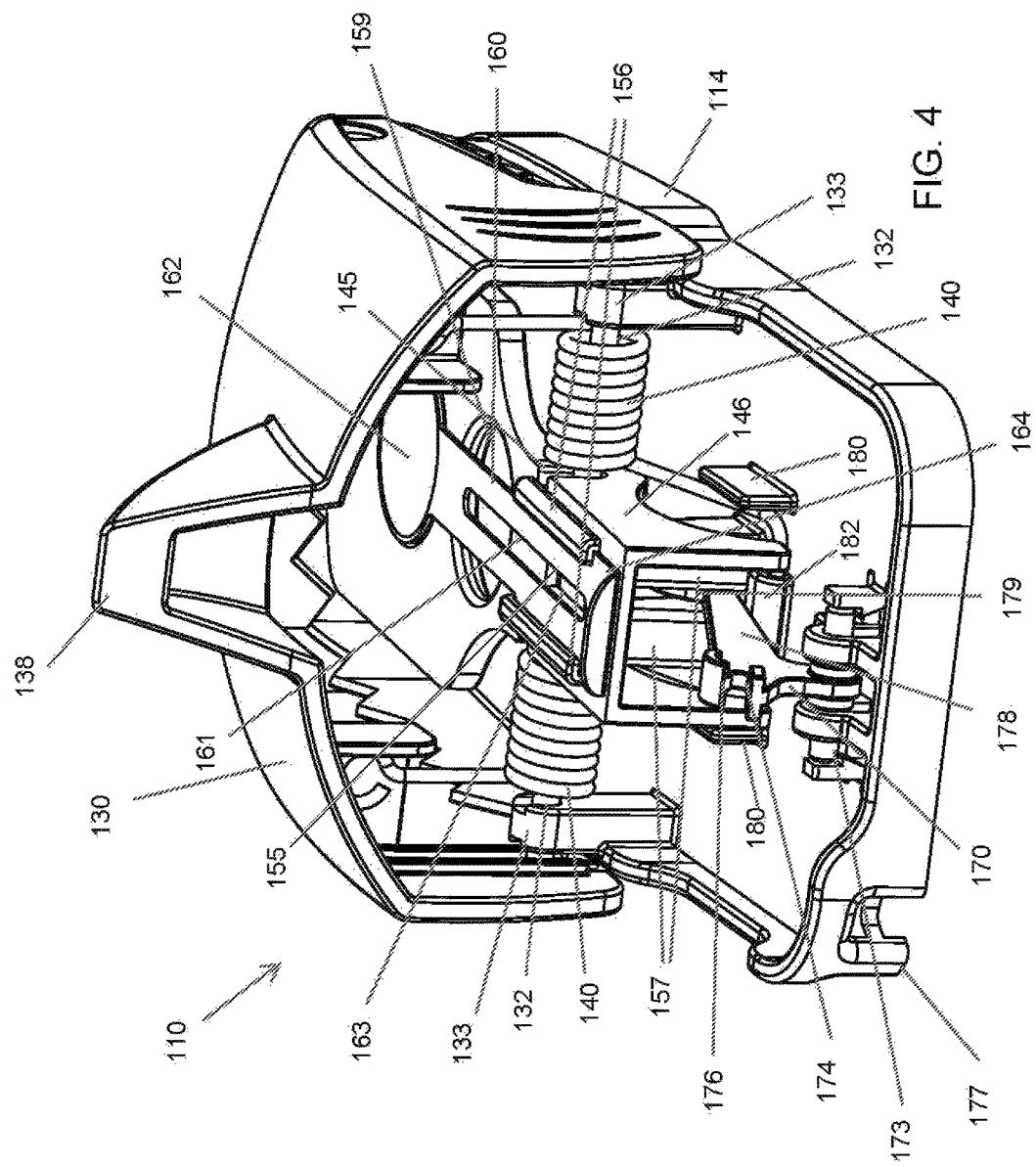

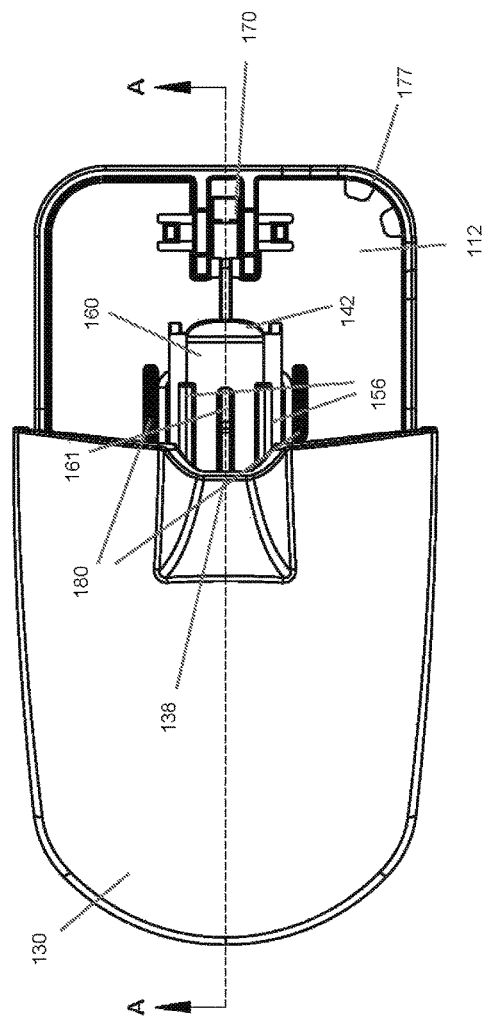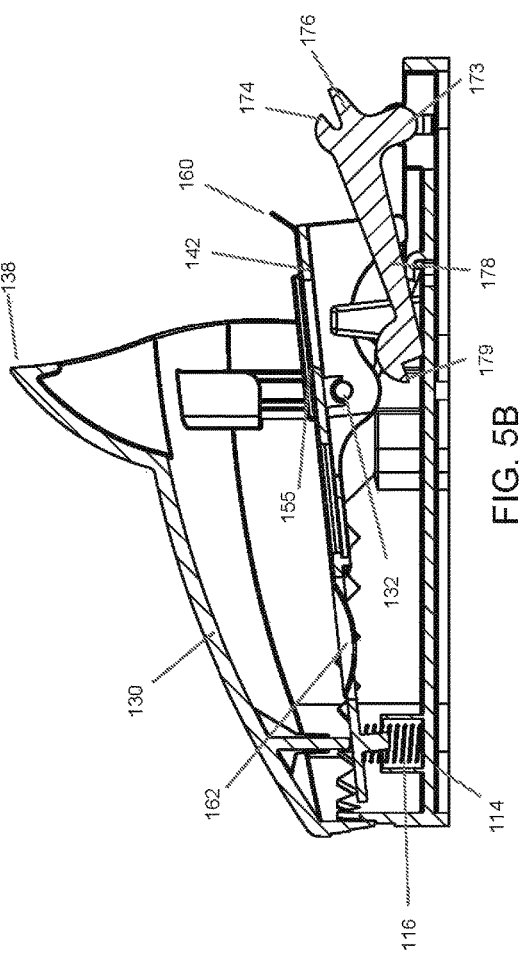
FIG. 5A
FIG. 5B

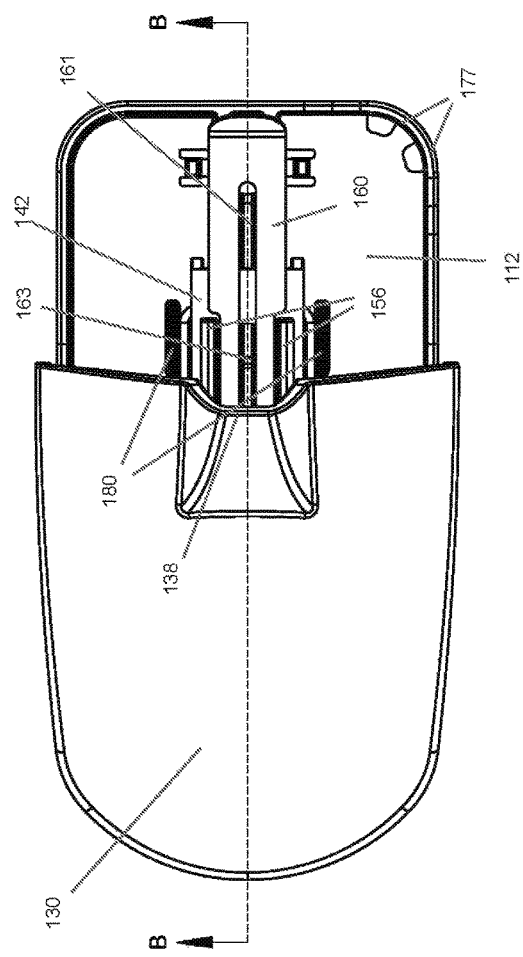
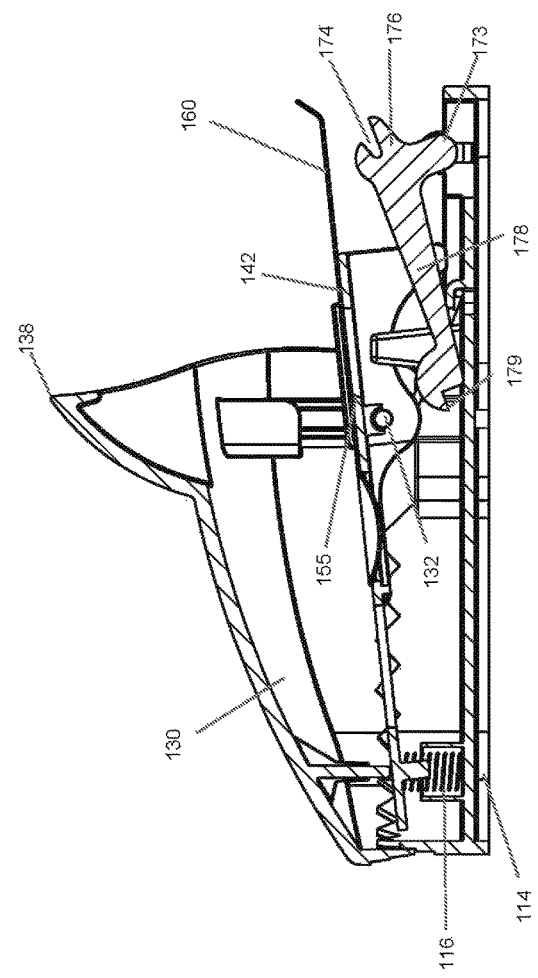
FIG. 6A
FIG. 6B

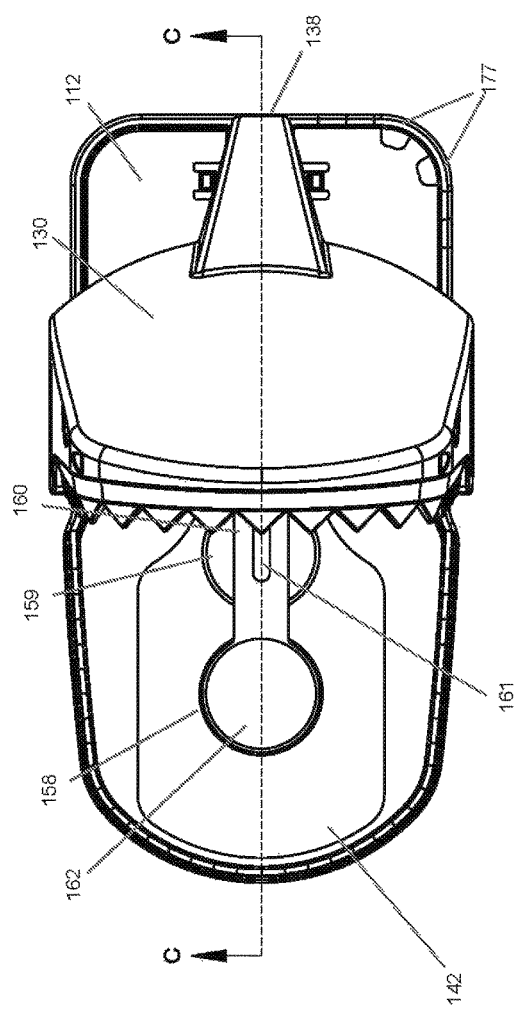
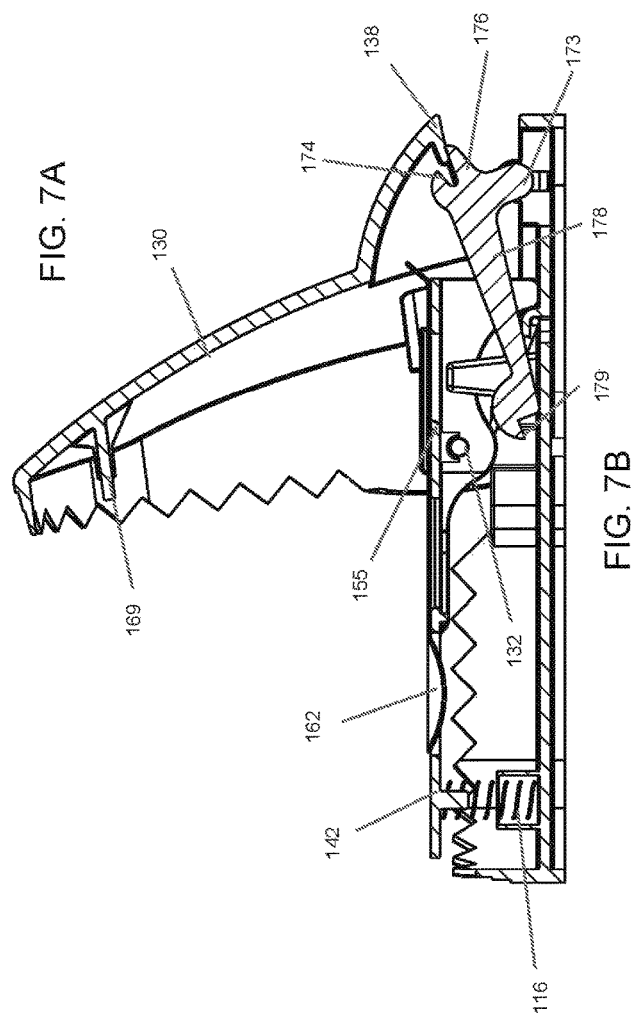
FIG. 7A
FIG. 7B

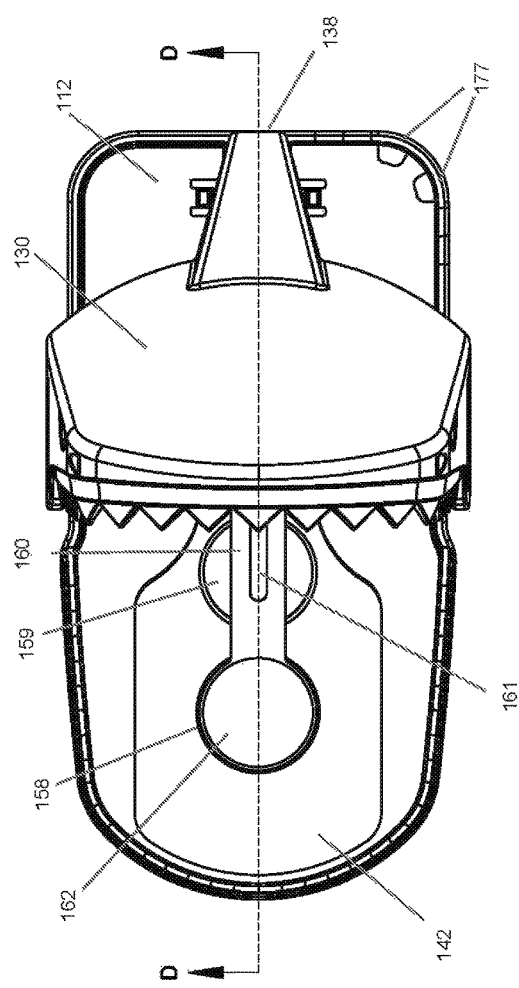
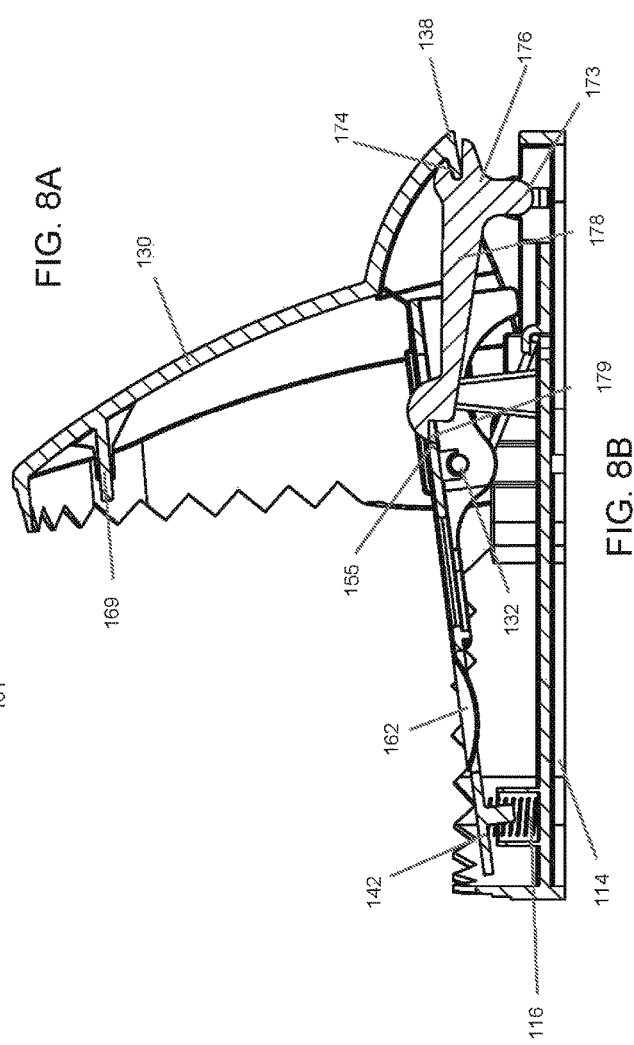

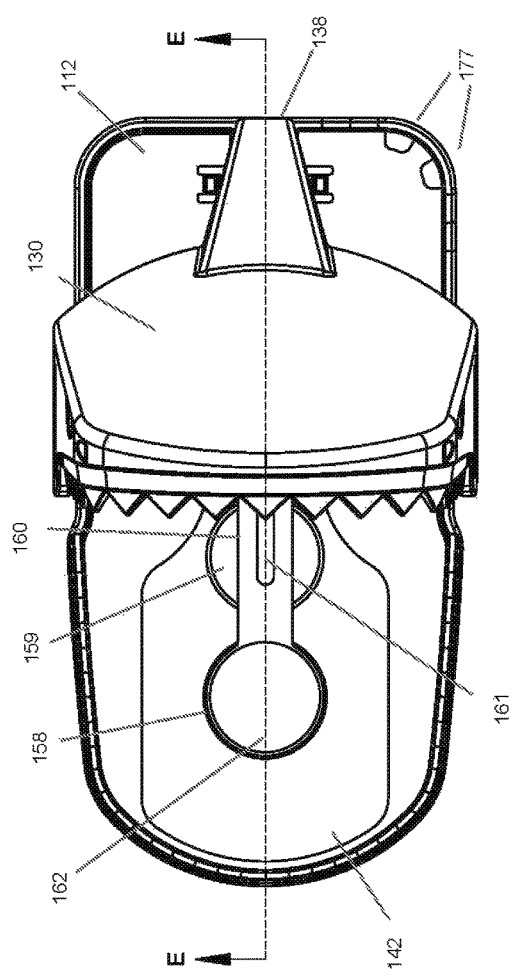

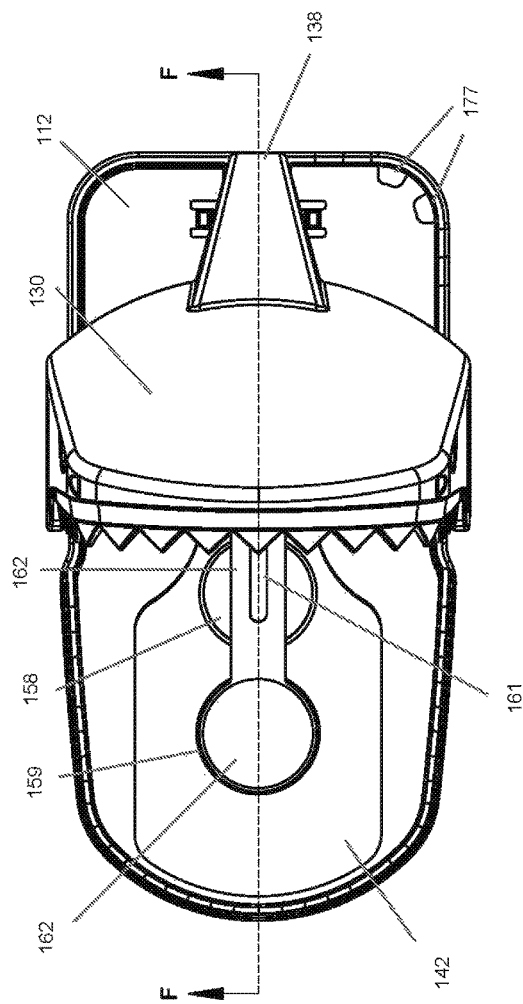
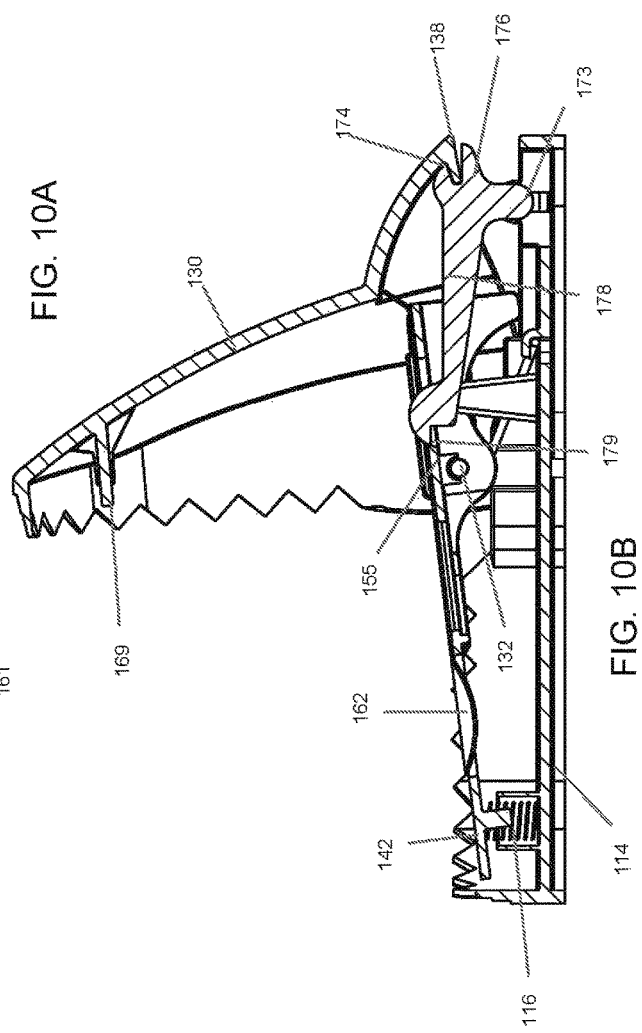
FIG. 10A
FIG. 10B

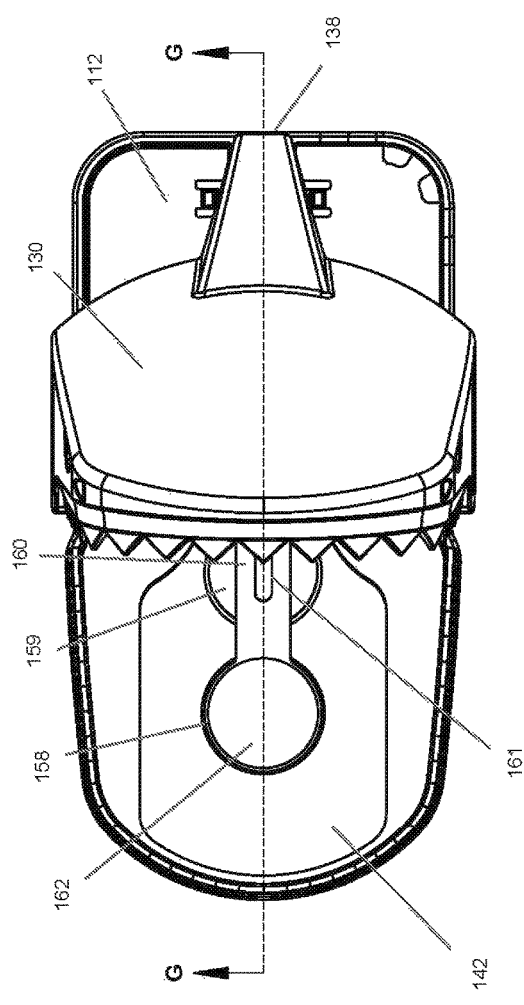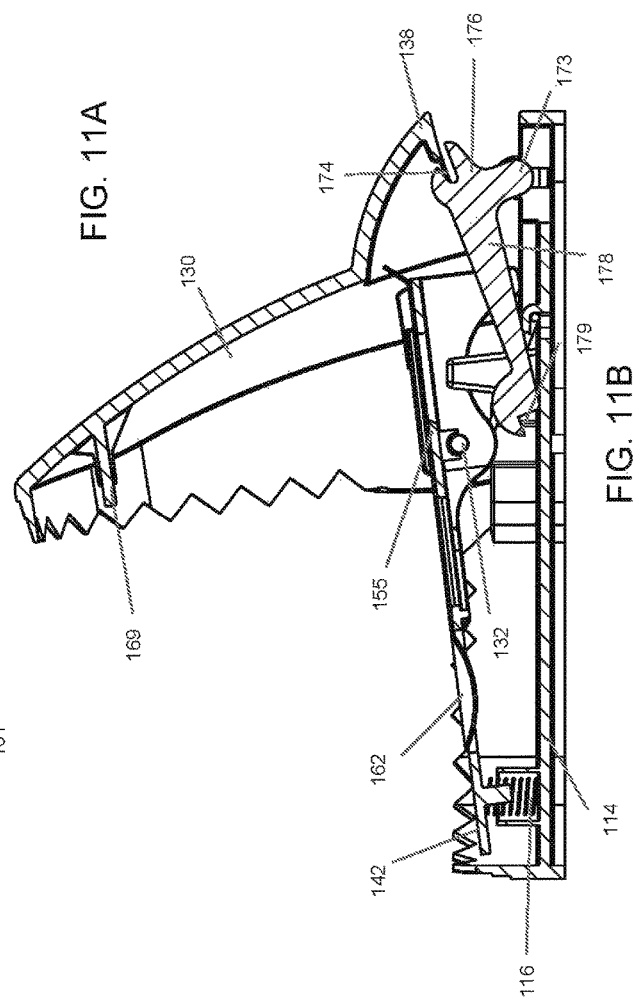
FIG. 11A
FIG. 11B

US 9,603,351 B1

ECOFRIENDLY MARITIME PEST MANAGEMENT KIT

RELATED APPLICATIONS

This application is a nonprovisional application of U.S. Provisional Patent Application Ser. No. 61/615,980, filed on Mar. 27, 2012 and titled ECOFRIENDLY MARITIME PEST MANAGEMENT KIT, the contents of which are herein incorporated by reference in its entirety.

FIELD OF THE INVENTION

The present invention relates generally to an ecofriendly maritime pest management kit. More so, the ecofriendly maritime pest management kit provides an eclectic assortment of pest management articles to humanely and safely manage pests on a maritime vessel.

BACKGROUND OF THE INVENTION

Pest control refers to the regulation or management of a species defined as a pest, such as a rat or an insect. The pest is perceived to be detrimental to a person's health, the ecology, or the economy; especially in an area where human's live and work. Pests carry diseases, consume food voraciously, nest, breed, and bite. The detrimental effects of pests are especially pronounced in a confined space, such as a boat, where both humans and pests have limited space to move or rest and food is confined to one small location. Furthermore, valuable commodities are usually onboard boats; thereby making the presence of pests on the boat a potential financial liability.

Traditionally, pests have been managed by killing them either by entrapment in a mechanical device, or by luring them to poisoned bait. The standard "mouse trap" often consists of a spring mounted bar that pivots from a cocked position at a great force onto the pest, with the weight of the pest releasing a trigger. However, setting the mechanical trap can be hazardous to the fingers. Poisoned bait is another common method for controlling pests. Poisoned meats have been used for centuries for killing off wolves, birds that were seen to threaten crops, and against other creatures. The discovery of several synthetic insecticides, such as DDT, and herbicides boosted the utilization of poisoning pests. Further, poisoned bait is also used to manage insects, such as ants, cockroaches, caterpillars, and the like. However this method is not as effective when there are other food sources around, such as garbage. And the toxic nature of poisoned bait creates a threat to human food sources, and possibly even children. Furthermore, containing the poisoned bait is difficult on a boat, where waves cause the boat to sway and heave. This results in poisoned bait dispersing throughout the boat.

Numerous commercial embodiments of pest management kits exist. These kits comprise of poisoned baits specific to a certain pest, coordinated with other forms of pest management designed to eliminate yet a different type of pest. These kits are generally useful for homes and businesses; however, there are no kits available for utilization on a maritime vessel, and the specific problems posed by pest management on a maritime vessel. Furthermore, the vast majority of pest management kits contain toxic chemicals that are detrimental to humans and the environment.

Even though the above cited pest management kits address some of the needs of the market, an ecofriendly pest management kit that is conducive for use on a maritime vessel is still desired.

SUMMARY OF THE INVENTION

This invention is directed to an ecofriendly maritime pest management that provides a compartmentalized and reusable container for transporting an eclectic assortment of pest management devices, nontoxic insecticides, and baits.

The ecofriendly maritime pest management kit has many novel features. These features enhance the capabilities to transport and compartmentalize pest management devices and nontoxic baits, and are useful for use on a maritime vessel on the ocean. The ecofriendly maritime pest management kit comprises a substantially rectangular housing fabricated from a flexible, yet durable material and further having exterior pouches for containing a plurality of articles. The pest management devices and nontoxic baits articles are segregated into different compartments and may, in one embodiment, be color coded for quick access. The pest management articles inside the pest management kit are pertinent for both the entrapment of pests, and also managing the distribution and setup of the entrapment devices and nontoxic baits. The ecofriendly maritime pest management kit includes a mechanical pest entrapment device, a gimbally mounted container for containing a predetermined quantity of nontoxic insecticide, an insect repellant delivery device, and an insect repellant solid composition, and a container for the insect repellant solid composition. Further pest management articles can include disinfecting liquids, rags, and disposable gloves. The exterior pouches give the user the option of carrying bait, sanitation gels, paper towels, contact information, medicine, or other pertinent articles beneficial for the maritime vessel and management of pests.

A first aspect of the present invention provides an ecofriendly maritime pest management kit comprising:
a housing for containing at least one pest management article, said housing having a top end, a bottom end, a manually operable fastener for mating said top end with said bottom end, a strap attached to said housing for control and storage, a plurality of internal compartments for segregating each pest management article, and at least one exterior pouch for storing and containing;
at least one mechanical entrapment device for entrapping a pest, the mechanical entrapment device comprising of:
 a base, the base comprising of at least one wall extending vertically from the perimeter of the base, the base further comprising a base spring trigger,
 an upper shell, the upper shell pivotally mounted to the base, the upper shell defined by a shell front end for engaging with the at least one wall, the upper shell further defined by a shell rear end, the upper shell further comprising a shell latching member extending from the shell rear end,
 a spring coiled around an upper shell pin, wherein the spring is connected at each end to the upper shell, wherein the spring exerts a force on the upper shell causing the upper shell to close upon the base,
 a tongue disposed on the base by a tongue support structure, the tongue having a tongue bait end and a tongue support end, wherein the tongue is pivotally mounted on the upper shell pin, the tongue support structure comprising a channel through which the upper shell pin passes, the tongue further comprising a tongue longitudinal aperture and a tongue ledge disposed at one end of the tongue longitudinal aperture, the tongue further comprising a wide section at the tongue bait end that terminates into a narrow section toward the tongue support end, wherein the tongue bait end is positioned above the base spring trigger, the tongue comprising a first aperture disposed on the wide section of the tongue bait end, wherein the first aperture is fixedly disposed above the base spring trigger, a pair of rails disposed in a parallel configuration on the tongue substantially parallel to the tongue longitudinal aperture, a bait holder, the bait holder extending along the longitudinal axis of the base and slidably engaged within the rails, the bait holder defined by a bait end, the bait holder further defined by a bait holder support end, the bait holder further comprising a bait holder longitudinal aperture substantially aligned with the tongue longitudinal aperture, the bait holder comprising a narrow section at the bait end that terminates into a wide section toward the bait holder support end, wherein the wide section of the bait holder is substantially equivalent in width to the distance between the rails and the narrow section of the bait holder is substantially narrower in width than the distance between the rails, wherein the bait holder can be detached from the mechanical entrapment device when the narrow section of the bait holder is positioned between the rails, wherein further the bait holder cannot be detached removed from the mechanical entrapment device when the wide section of the bait holder is positioned between the rails, wherein the bait end of the bait holder comprises a significantly concave shape configured for receiving a predetermined quantity of bait, wherein the bait end of the bait holder mates with the first aperture of the tongue bait end above the base spring trigger when the bait holder is fully slidably inserted into the mechanical entrapment device, a trigger catch member comprising a notch for securing the shell latching member when the upper shell is pivoted around the upper shell pin to an open position, the trigger catch member further comprising a trigger catch member notch end and a trigger catch member tongue end, wherein when the upper shell is pivoted into an open position the shell latching member travels to securely engage with the notch in the trigger catch member notch end, causing the trigger catch member tongue end to pivot upward between the tongue longitudinal aperture and the bait holder longitudinal aperture to position on top of the tongue ledge, whereby the downward force exerted by the trigger tongue end when it is disposed onto the tongue ledge causes a downward force on the tongue support end, causing the tongue bait end and the bait holder bait end to both pivot upwardly, causing the base spring trigger to extend into a locked position, wherein the weight of a pest as it consumes bait disposed in the bait end of the bait holder exerts a downward force on the tongue bait end, causing the trigger catch member tongue end to pivotally lift above and release from the tongue ledge, causing the trigger catch member notch end to disengage from the shell latching member, causing the spring to release stored energy and pivot the upper shell to a closed position onto the base, forming a cavity between the upper shell and the base that traps the pest within the interior of the mechanical entrapment device, at least one gimbally mounted insecticide container for containing a predetermined quantity of nontoxic insecticide and mounted so that the gimbally mounted insecticide container maintains a substantially upright position independent of the motion of a mounting surface, the gimbally mounted insecticide container comprising an inner container for containing the nontoxic insecticide, the gimbally mounted insecticide container further comprising at least one external shell for enclosing the inner container, the gimbally mounted insecticide container further comprising an aperture for allowing pests ingress and egress into the inner container, the gimbally mounted insecticide container further comprising a hinge for rotatably supporting the gimbally mounted insecticide container, the gimbally mounted insecticide container further comprising an attaching member for attaching the gimbally mounted insecticide container to the mounting surface, wherein the pest enters and exits the gimbally mounted insecticide container through the aperture, wherein the pest engages the nontoxic insecticide when inside the gimbally mounted insecticide container;

at least one nontoxic insect repellant delivery device for spraying a predetermined quantity of nontoxic insect repellant; and at least one nontoxic insect repellant solid composition for repelling pests, wherein the nontoxic insect repellant solid composition is activated by thermal exposure.

In a second aspect, the ecofriendly maritime pest management kit further comprises a container of nontoxic insecticide suitable for filling and refilling the gimbally mounted insecticide container.

In another aspect, the ecofriendly maritime pest management kit further comprises one or more insect glue traps.

In another aspect, the ecofriendly maritime pest management kit provides a nontoxic and humane solution for managing pests on a maritime vessel.

In another aspect, the mechanical entrapment device is configured to resemble a shark.

In another aspect, a container holding bait for the mechanical entrapment device, and optionally a bait utensil for loading the bait onto the bait holder of the mechanical entrapment device, is provided. In one embodiment, the bait utensil comprises the bait end of the bait holder.

In another aspect, each gimbally mounted insecticide container maintains a substantially upright position independent of the motion of a mounting surface, wherein the nontoxic insecticide does not disperse outside the inner container when a maritime vessel moves.

In another aspect, the external shell of each gimbally mounted insecticide container comprises a textured surface to aid access to the aperture by a pest. substantially upright position independent of the motion of a mounting surface, wherein the nontoxic insecticide does not disperse outside the inner container when a maritime vessel moves In another aspect, the nontoxic insecticide is sodium borate.

In yet another aspect, the nontoxic insect repellant delivery device sprays a nontoxic insect repellant such as neem oil, nontoxic DEET, and the like.

In yet another aspect, the nontoxic insect repellant solid composition comprises a citronella candle, a cinnamon candle, and the like.

In another, the ecofriendly maritime pest management kit is segregated by the plurality of internal compartments.

In another aspect, the internal compartments are color coded, sized, and shaped to hold the at least one pest management article with a correlating color and contour, wherein a user can quickly segregate and identify the desired at least one pest management article.

In another aspect, the housing is fabricated from a lightweight, flexible, durable, and washable material or similar extrusion.

In another aspect, the housing is transparent.

In another aspect, the fastener is a zipper that extends around multiple sides of the housing and fastens the top end to the bottom end.

In another aspect, the exterior pouch contains bait, sanitation gels, paper towels, contact information, medicine, or other pertinent articles beneficial for the maritime vessel and management of pests.

In another aspect, the exterior pouch fastens with a zipper, a snap button, a clip, and the like.

In another aspect, in operation, the pest situation in the maritime vessel would be assessed to determine the appropriate pest management article for use. The ecofriendly maritime pest management kit is small and portable enough to stow away on a maritime vessel and be carried easily. The ecofriendly maritime pest management kit is opened by grasping the fastener and pulling the zipper around the exterior of the housing. The top end is lifted to reveal the internal compartments containing the pest management articles. Each internal compartment can, in one embodiment, be color coded to correlate with a similarly colored pest management article. This allows the user to quickly scan the internal compartments and select the desired pest management article.

One benefit of the ecofriendly maritime pest management kit is that it provides a full gamut of pest management articles in a small, portable kit that is easily stored in the limited confines of a maritime vessel.

Another benefit is that the ecofriendly maritime pest management kit provides a nontoxic method for managing pests on a maritime vessel.

Another benefit is that the ecofriendly maritime pest management kit can be color coded to allow for expedited selection of the desired pest management article.

Another benefit of the ecofriendly maritime pest management kit is that the bait holder can be loaded with bait while outside of the mechanical entrapment device, thereby creating a safe bait loading function.

Another benefit is that the ecofriendly maritime pest management kit can be organized with chemical products on one side, and nonchemical products on another side of the internal compartments.

In yet another benefit, the ecofriendly maritime pest management kit allows for a plurality of personal articles, which can be utilized to assist during the pest management scenario, to be stored in the external pouch.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 4 presents a detailed rear perspective of one embodiment of the mechanical entrapment device in the closed position;

FIGS. 5A and 5B present a top view and a side sectional view of the mechanical entrapment device in the closed position with the bait holder retracted within the mechanical entrapment device;

FIGS. 6A and 6B present a top view and a side sectional view of the mechanical entrapment device in the closed position with the bait holder withdrawn to the outside of the mechanical entrapment device;

FIGS. 7A and 7B present a top view and a side sectional view of the mechanical entrapment device as it is being opened;

FIGS. 8A and 8B present a top view and a side sectional view of the mechanical entrapment device as it is being locked in the open position;

FIGS. 9A and 9B present a top view and a side sectional view of the mechanical entrapment device as it is being locked in the open position;

FIGS. 10A and 10B present a top view and a side sectional view of the mechanical entrapment device as it appears when the weight of a pest exerts a downward force on the base spring trigger;

FIGS. 11A and 11B present a top view and a side sectional view of the mechanical entrapment device as it releases from the open position following the exertion of a downward force on the base spring trigger by a pest as it consumes bait from the bait holder;

Like reference numerals refer to like parts throughout the various views of the drawings.

DETAILED DESCRIPTION OF THE INVENTION

Figure 1A:
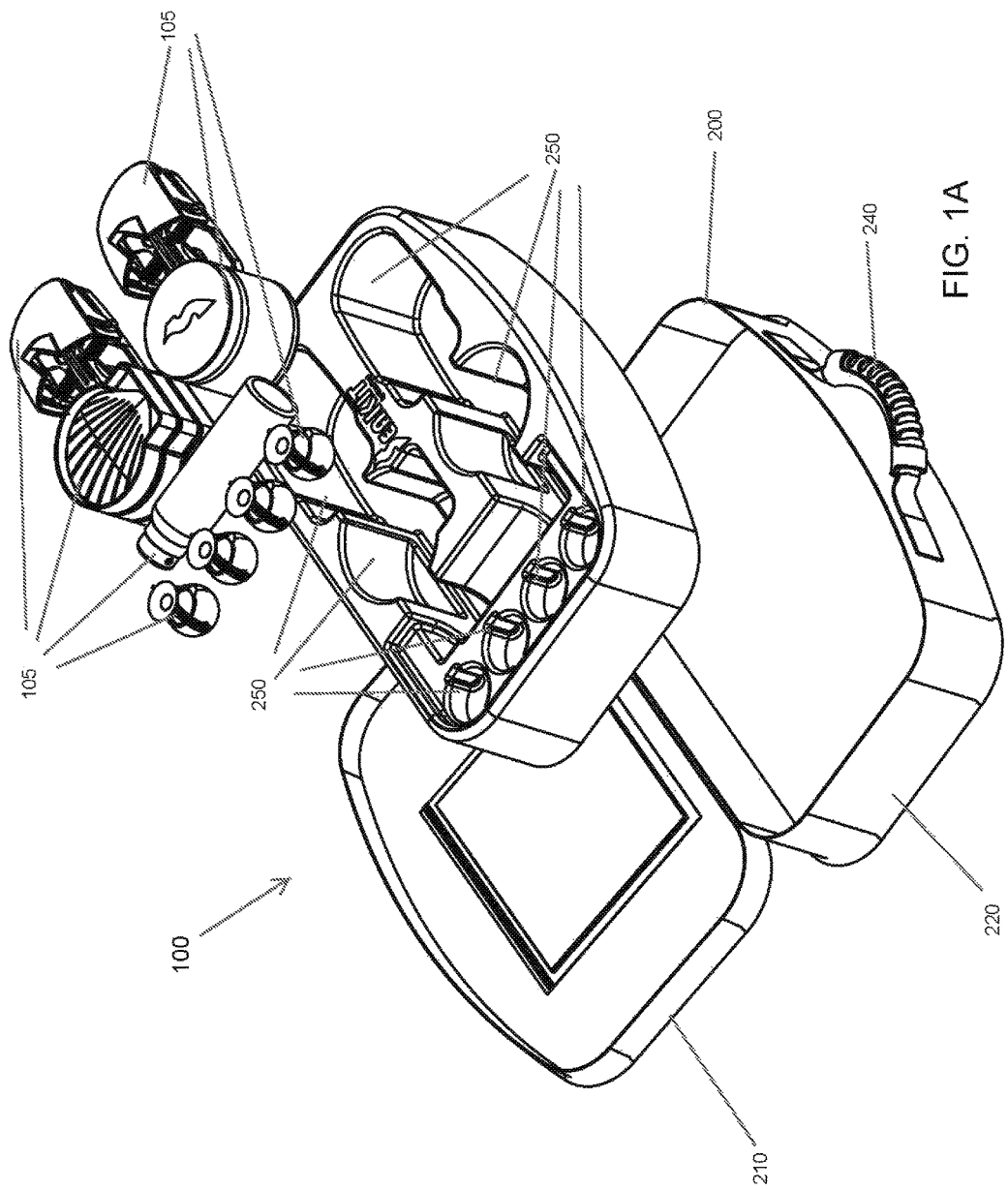
FIG. 1A presents an exploded perspective view of a ecofriendly maritime pest management kit and the respective pest management articles.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1 through 16. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An ecofriendly maritime pest management kit is designed to provide an eclectic assortment of pest management articles to humanely and safely manage pests on a maritime vessel. In operation, the pest situation in the maritime vessel would first be assessed to determine the appropriate pest management article for use. The ecofriendly maritime pest management kit is small and portable enough to stow away on a maritime vessel and be carried easily, so moving from one point on the maritime vessel to another is relatively easy with the ecofriendly maritime pest management kit. The ecofriendly maritime pest management kit is opened by grasping a fastener and pulling the zipper around the exterior of housing. The top end of the kit is lifted to reveal internal compartments that contain pest management articles. Each internal compartment can be color coded to correlate with a similarly colored pest management article. This allows the user to quickly scan internal compartments and select the desired pest management article.

The mechanical entrapment device is efficacious for entrapping common pests living in the maritime vessel such as rats and mice. Each mechanical entrapment device is positioned on a flat surface. It is preferable to secure the mechanical entrapment device to the surface by wedging it into a corner, or fastening it to a wall, table, chair, and the like. Those skilled in the art can appreciate that the mechanical entrapment device can be dimensioned to entrap different types of pests, and even animals The pest management articles of the ecofriendly maritime pest management kit may comprise a container holding bait for the mechanical entrapment device, and optionally a bait utensil for loading the bait into the mechanical entrapment device. In one embodiment, the bait comprises peanut butter. In one embodiment, the container comprises a glass container. In one embodiment, the container comprises a plastic container. In one embodiment, the bait utensil comprises the bait end of the bait holder. In one embodiment, the bait utensil comprises a spoon.

Gimbally mounted insecticide containers can also be included in the ecofriendly maritime pest management kit which can fasten to a mounting surface such as a wall or a bottom surface of a table, such as by use of a suction cup. The mounting surface may be located above gimbally mounted insecticide container. In other embodiments, the mounting surface can be disposed at any angle to the gimbally mounted insecticide container, such as a countertop below the gimbally mounted insecticide container or a wall. The gimbally mounted insecticide container maintains a substantially upright position independent of motion of mounting surface which prevents nontoxic insecticide inside the gimbally mounted insecticide container when the maritime vessel sways or heaves from the motion of waves. A pest, such as an ant, cockroach or caterpillar enters the gimbally mounted insecticide container through an aperture and exits back to its nest where it dies shortly thereafter and additionally carries insecticide to its nest to kill others in the nest. In one embodiment, the outer surface of the gimbally mounted insecticide container is textured which assists the pests in traversing the outer surface to gain access to the aperture.

Those skilled in the art can appreciate that a full gamut of solid, powder, or liquid insecticides can be utilized with the gimbally mounted insecticide container. For example, in one embodiment, nontoxic insecticide comprises borax. The basic principle of retaining an upright position applies to all solid forms of nontoxic insecticide.

There are numerous dispersion devices that can be included in the ecofriendly maritime pest management kit. For example, a nontoxic insect repellant delivery device may comprise a spray bottle capable of dispersing nontoxic insect repellant. In one embodiment, the delivery device utilizes an aerosol propellant. In some embodiments, nontoxic insect repellant delivery device sprays a nontoxic insect repellant such as neem oil, nontoxic DEET, and the like. Similarly, nontoxic insect repellant solid composition can be utilized for repelling pests In some embodiments, nontoxic insect repellant solid composition can be activated by thermal exposure, such as a citronella candle activated by lighting the candle's wick. An eclectic variety of salt and oils can be included that disperse a vapor or gas that repels pests such as mosquitoes and flies. Furthermore each exterior pouch provides storage for useful articles such as sanitation gel to clean hands after contacting pests, and paper towels to wipe chemicals from surfaces.

Additionally, static devices may be included in the ecofriendly maritime pest management kit. For example, an insect glue trap comprising a piece of cardboard, fiberboard, or plastic that is coated with a sticky adhesive may be included for catching insects in the adhesive. The used insect glue traps can be discarded and replaced with fresh traps. Insect glue traps can be stored in the ecofriendly maritime pest management kit in the form of a flat panel and assembled when desired for use.

After utilizing pest management articles, any unused portions can be stored back into the ecofriendly maritime pest management kit for future use. The housing can be efficacious in sealing tightly enough so that no liquids or contaminants can seep in or out. The ecofriendly maritime pest management kit is portable enough so that it can be stored in the limited space that a maritime vessel provides.

Turning to the figures, one embodiment of an ecofriendly maritime pest management kit 100 is shown in FIG. 1A comprising a housing 200 for containing a plurality of pest management articles 105. The ecofriendly maritime pest management kit 100 is fabricated from a flexible lightweight, durable and washable material such as antibacterial fabric, plastic, leather, and the like. In one embodiment, the housing 200 is transparent. The housing 200 comprises a top end 210 and a bottom end 220 that can utilize a zipper or Velcro to both mate and separate the top end 210 and the bottom end 220. The housing 200 can further comprise a handle 240. The zipper can extend around all or a portion of housing 200. Other methods to mate and separate top end 210 and bottom end 220 can be used, and the invention is not intended to be limited to this embodiment. A strap (not shown) for securing ecofriendly maritime pest management kit 100 around a hand or hanging the ecofriendly maritime pest management kit 100 to a mounting, hook, bar, and the like can be attached to housing 200. Ecofriendly maritime pest management kit 100 comprises a plurality of internal compartments 250 to segregate and identify pest management articles 105. Each internal compartment 250 can be color coded and configured to correlate specifically to each pest management article 105. This allows for expedited identification and selection of each pest management article 105. At least one exterior pouch (not shown) can be positioned on the outside of the housing 200 and can be fastened with a snap-on button, zipper, clip, and the like.

The ecofriendly maritime pest management kit 100 is configured to contain a full gamut of pest management articles 105. The pest management articles 105 are efficacious in managing a pest management scenario on a maritime vessel in an ecofriendly manner.

In the embodiment depicted in FIG. 1A, the ecofriendly maritime pest management kit 100 comprises at least one mechanical entrapment device for entrapping a pest, such as a rat, mouse, and the like as described in more detail with respect to FIGS. 2-11. The ecofriendly maritime pest management kit 100 of FIG. 1A further comprises pest management articles 105 including a plurality of gimbally mounted insecticide containers as described in more detail with respect to FIGS. 12A and 12B; at least one nontoxic insect repellant delivery device for spraying a predetermined quantity of nontoxic insect repellant as described in more detail with respect to FIG. 14; and at least one nontoxic insect repellant solid composition for repelling pests as described in more detail with respect to FIG. 15, wherein the nontoxic insect repellant solid composition is activated by thermal exposure.

Figure 1B:
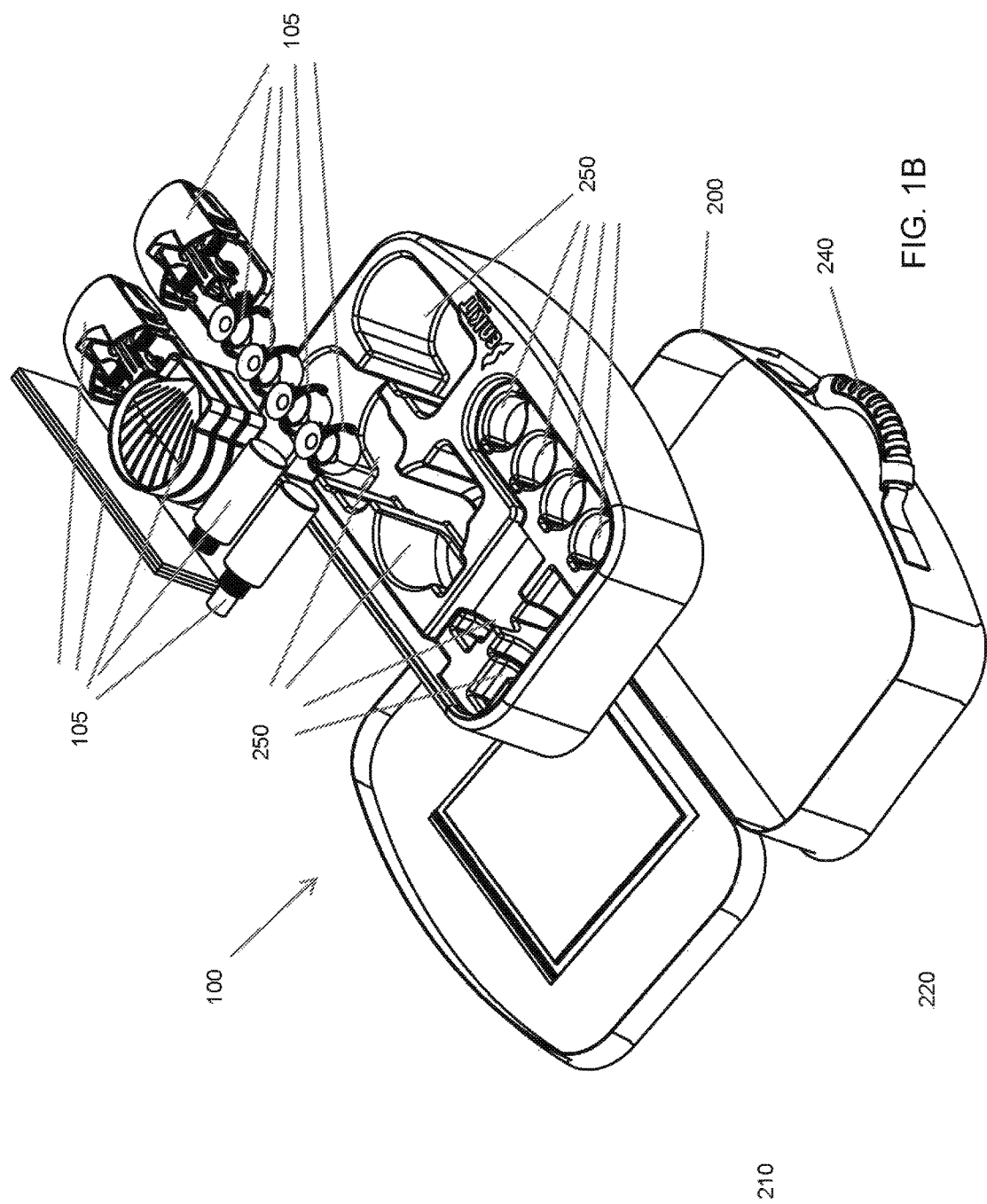
FIG. 1B presents an exploded perspective view of an alternative embodiment of the ecofriendly maritime pest management kit and the respective pest management articles.

A second embodiment of the ecofriendly maritime pest management kit 100 is shown in FIG. 1B. In the embodiment depicted in FIG. 1B, the ecofriendly maritime pest management kit 100 comprises at least one mechanical entrapment device for entrapping a pest, such as a rat, mouse, and the like as described in more detail with respect to FIGS. 2-11. The ecofriendly maritime pest management kit 100 of FIG. 1B further comprises as described in more detail with respect to FIGS. 12A and 12B; a container of nontoxic insecticide suitable for filling and refilling the gimbally mounted insecticide container as described in more detail with respect to FIG. 13; at least one nontoxic insect repellant delivery device for spraying a predetermined quantity of nontoxic insect repellant as described in more detail with respect to FIG. 14; at least one nontoxic insect repellant solid composition for repelling pests as described in more detail with respect to FIG. 15, wherein the nontoxic insect repellant solid composition is activated by thermal exposure; and, one or more insect glue traps as described in more detail with respect to FIG. 16.

Figure 2:
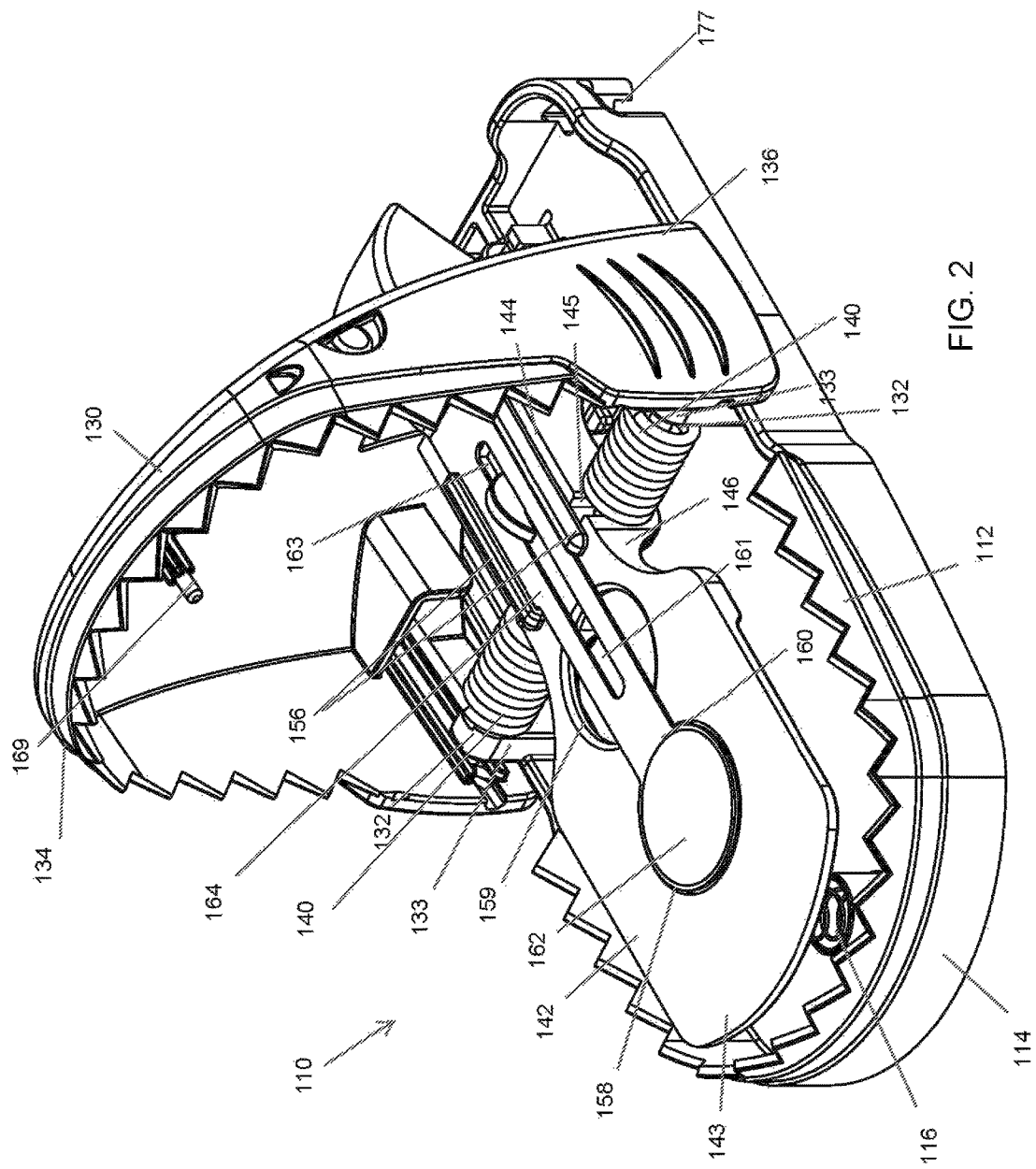
FIG. 2 presents a detailed front perspective view of a mechanical entrapment device in the open position.

Mechanical entrapment device 110 is shown in further detail in FIGS. 2-11. FIG. 2 provides a front perspective view of mechanical entrapment device 110 in its open position, wherein mechanical entrapment device 110 comprises a base 112 and a plurality of walls 114 extending vertically from the perimeter of base 112 that can be used to support or attach mechanical entrapment device 110 on or to a surface or fixture. Mechanical entrapment device 110 further comprises a base spring trigger 116 disposed on base 112. Mechanical entrapment device 110 further comprises upper shell 130 which forms an enclosure in conjunction with base 112 suitable for containing a pest within mechanical entrapment device 110 when upper shell 130 is in a closed position. A spike 169 can be disposed on the top inner surface of upper shell 130 which can further detain a pest caught in mechanical entrapment device 110. In one embodiment, upper shell 130 is shaped to resemble the upper jaw of a shark. Upper shell 130 is pivotally mounted on upper shell pin 132, where upper shell pin 132 is fixedly attached to upper shell pin attachment mechanisms 133 which are disposed on base 112. Upper shell 130 is defined by a shell front end 134 for engaging with wall 114. Upper shell 130 is further defined by a shell rear end 136. Tie-down post 177 can be molded as part of base 112 for attaching mechanical entrapment device 110 to a fixture, for example using string, wire, a zip tie or any other restraint. Alternatively, or additionally, a plurality of screw mounts (not shown) can be drilled through base 112 for securing base 112 to a ground surface.

Mechanical entrapment device 110 further comprises a tongue 142 supported at tongue bait end 143 by base spring trigger 116 and supported at tongue support end 144 by tongue support structure 146 disposed on base 112. Upper shell pin 132 passes through channel 145 of tongue support structure 146. Spring 140 coils around upper shell pin 132 and passes behind tongue support structure 146 such that spring 140 is in fixed communication directly or indirectly at each end with inside of upper shell 130 such that rotation of upper shell 130 into an open position winds spring 140, causing energy to be stored in spring 140. Those skilled in the art can appreciate that spring 140 can be configured to create more or less force by increasing or reducing the number of coils of spring 140 around upper shell pin 132. A pair of rails 156 is disposed atop tongue 142 substantially toward tongue support end 144. Tongue 142 further comprises a wide section toward tongue bait end 143 that terminates into a narrow section toward tongue support end 144. Tongue 142 further comprises a first tongue aperture 158, wherein first tongue aperture 158 is disposed substantially above base spring trigger 116. In the embodiment shown in FIG. 2, tongue 142 optionally comprises a second tongue aperture 159, which is disposed on tongue 142 further toward tongue support end 144 with respect to first tongue aperture 158. Tongue 142 further comprises tongue longitudinal aperture 163.

Mechanical entrapment device 110 further comprises bait holder 160 which comprises bait holder longitudinal aperture 161, wherein bait holder longitudinal aperture 161 is disposed substantially above and coincides with tongue longitudinal aperture 163 when bait holder 160 is fully inserted into mechanical entrapment device 110. Bait holder 160 is defined by bait end 162 which is concave shaped and configured for receiving bait (not shown). When bait holder 160 is inserted fully inside of mechanical entrapment device 110, bait holder bait end 162 rests in first tongue aperture 158. Bait holder 160 is further defined by bait holder support end 164. Bait holder 160 comprises a narrow section toward bait end 162 that terminates into a wide section toward bait holder support end 164. Bait holder 160 is configured to be slidably inserted between rails 156, wherein the wide section of bait holder 160 is slightly narrower in width than the distance between rails 156 and the narrow section of bait holder 160 is substantially narrower in width than the distance between rails 156, wherein bait holder 160 can be disengaged from rails 156 and fully detached from mechanical entrapment device 110 when the narrow section of bait holder 160 is positioned between rails 156, wherein further bait holder 160 cannot be disengaged from rails 156 and fully detached from mechanical entrapment device 110 when the wide section of bait holder 160 is positioned between rails 156. Bait can easily be loaded into bait holder bait end 162 when bait holder 160 is fully detached from mechanical entrapment device 110, and loaded bait holder 160 can then be fully inserted back into mechanical entrapment device 110 while in a closed and safe position. This configuration allows mechanical entrapment device 110 to be loaded with bait without the user having to place fingers under upper shell 130 while in its dangerous open position, thus reducing or removing entirely the possibility of having mechanical entrapment device 110 close on the user's hand or fingers and causing injury.

Figure 3:
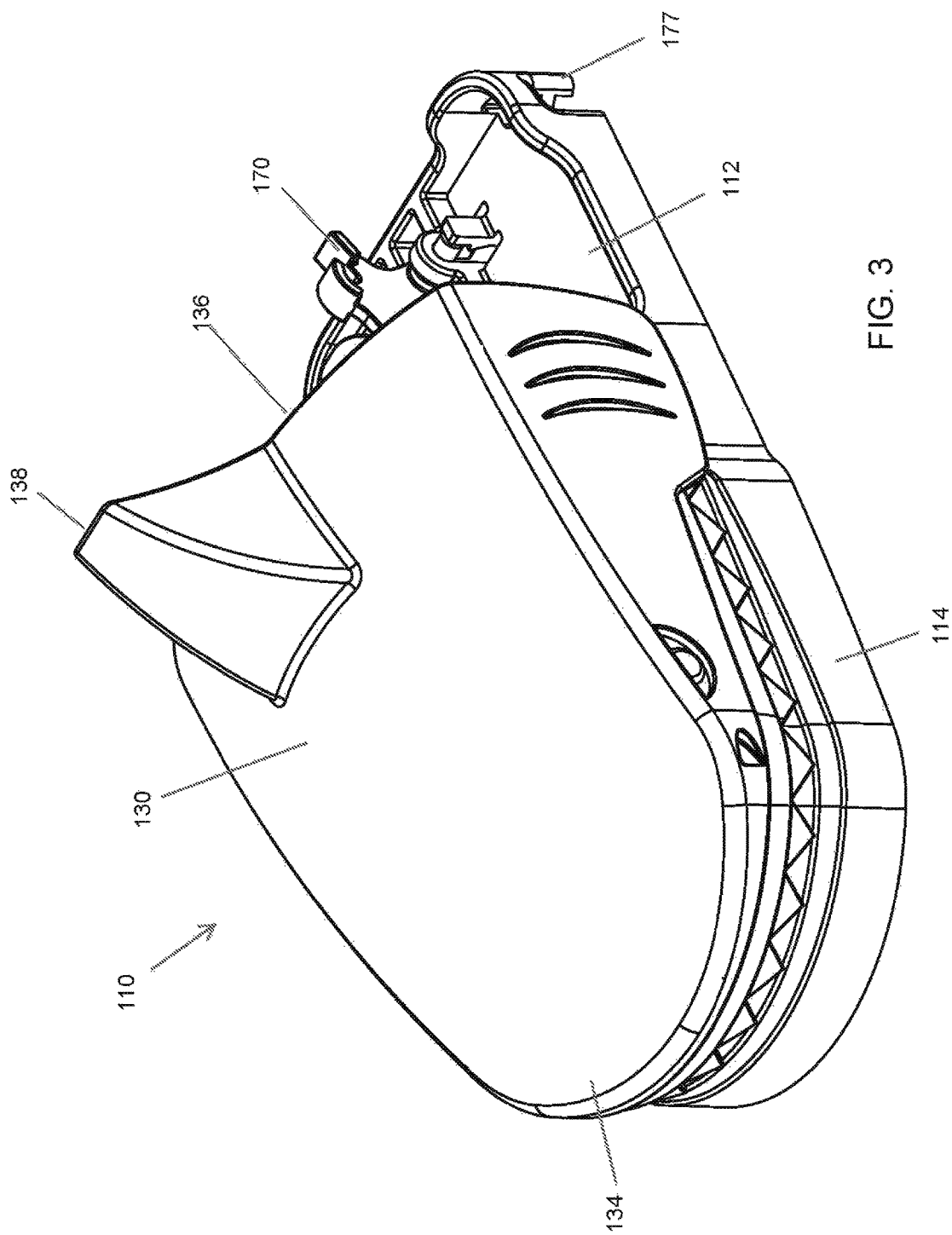
FIG. 3 presents a detailed front perspective of the mechanical entrapment device in the closed position.

FIG. 3 provides a front perspective view of mechanical entrapment device 110 in its closed position. Upper shell 130 further comprises shell latching member 138 extending from shell rear end 136. Mechanical entrapment device 110 further comprises trigger catch member 170 configured to restrain shell latching member 138 and thus securing upper shell 130 when in its open position.

FIG. 4 provides a rear perspective view of mechanical entrapment device 110 which further comprises trigger catch member 170. Trigger catch member 170 is defined by trigger catch member tongue 178, which comprises trigger catch member tongue notch end 176 having notch 174 configured to mate with and secure shell latching member 138. Trigger catch member tongue 178 is pivotally attached to base 112 by way of trigger catch member tongue pin 173. Trigger catch member tongue 178 further comprises trigger catch member tongue ledge end 179 configured to engage tongue ledge 155. When upper shell 130 is urged into its open position, trigger catch member tongue 178 pivotally positions around trigger catch member tongue pin 173 such that trigger catch member tongue ledge end 179 passes upwardly through tongue longitudinal aperture 163 and bait holder longitudinal aperture 161 and engages with and rest on top of tongue ledge 155. Trigger catch member tongue guidewalls 157 are disposed on base 112 to each side of the trajectory of the pivot of trigger catch member tongue 178 to guide trigger catch member tongue end 179 to pass through tongue longitudinal aperture 163 and bait holder longitudinal aperture 161 and then to engage with and rest on top of tongue ledge 155. Spring guides 180 guide spring 140 behind tongue support structure 146 and spring clamp 182 holds spring 140 in place on top of base 112.

FIGS. 5-11 depict overhead and side cross-sectional views of the mechanical entrapment device 110 in use.

FIG. 5A depicts an overhead view of mechanical entrapment device 110 in its closed position. FIG. 5B depicts a side cross-sectional view of Line A-A of FIG. 5A. In FIG. 5B, mechanical entrapment device 110 is in its closed position and bait holder 160 is fully inserted inside the interior of the mechanical entrapment device 110.

FIG. 6A depicts a top view of mechanical entrapment device 110 in its closed position with bait holder 160 retracted to the outside of mechanical entrapment device 110. FIG. 6B depicts a side cross-sectional view of Line B-B of FIG. 6A.

FIG. 7A depicts a top view of mechanical entrapment device 110 at the beginning of the process of being set to its opened and locked position. FIG. 7B depicts a side cross-sectional view of Line C-C of FIG. 7A. In FIG. 7B, upper shell 130 of mechanical entrapment device 110 is shown as it is placed in its open position with shell latching member 138 engaging notch 174 of trigger catch member tongue notch end 176.

FIG. 8A depicts a top view of mechanical entrapment device 110 in the process of being locked in the open position. FIG. 8B depicts a side cross-sectional view of Line D-D of FIG. 8A. In FIG. 8B, as shell latching member 138 fully engages notch 174 of trigger catch member tongue notch end 176, trigger catch member tongue 178 pivots around trigger catch member tongue pin 173. Trigger catch member tongue ledge end 179 has a rounded top surface and a notched bottom surface. The top surface of tongue ledge 155 extends further than the bottom surface of tongue ledge 155 toward tongue support end 144, causing an angled surface between the top and bottom surfaces of tongue ledge 155. As trigger catch member tongue ledge end 179 pivots upward, the top rounded surface of trigger catch member tongue ledge end 179 slides up along the angled surface between the top and bottom surfaces of tongue ledge 155, passing through bait holder longitudinal aperture 161 and tongue longitudinal aperture 163 until notched bottom surface of trigger catch member tongue ledge end 179 rises above the top surface of tongue ledge 155.

FIG. 9A depicts a top view of mechanical entrapment device 110 as it is locked in the open position. FIG. 9B depicts a side cross-sectional view of Line E-E of FIG. 9A. In FIG. 9B, shell latching member 138 has been restrained by notch 174 of trigger catch member tongue notch end 176, locking upper shell 130 in its opened position. The notched bottom surface of trigger catch member tongue ledge end 179 rests on the top surface of tongue ledge 155. As trigger catch member tongue end 178 rises above and then comes down to rest on the top surface of tongue ledge 155, a downward force is exerted onto tongue support end 144 which pivots downward around upper shell pin 132, causing tongue bait end 152 and bait holder bait end 162 to pivot upwardly. Base spring trigger 116 then extends into a locked position. The combination of shell latching member 138 securing into notch 174 of trigger catch member notch end 176 and base spring trigger 116 extending into the locked position restrains upper shell 130 in the open position. The rotation of upper shell 130 from the closed to the open position creates tension in spring 140 which is maintained while mechanical entrapment device 110 is in the open and locked position.

FIG. 10A depicts a top view of mechanical entrapment device 110 as it appears when the weight of a pest exerts a downward force on base spring trigger 116. FIG. 10B depicts a side cross-sectional view of Line F-F of FIG. 10A. In FIG. 10B, as a pest passes over bait holder bait end 162, the weight of the pest exerts a downward force on tongue bait end 152 causing tongue support end 144 including tongue ledge 155 to pivot upwardly around upper shell pin 132. The upward pivot of tongue ledge 155 causes trigger catch member tongue ledge end 179 to pivot upwardly around trigger catch member tongue pin 173 until the notched bottom surface of trigger catch member tongue ledge end 179 rises above and then disengages with tongue ledge 155.

FIG. 11A depicts a top view of mechanical entrapment device 110 as it is being released from its open position. FIG. 11B depicts a side cross-sectional view of Line G-G of FIG. 11A. In FIG. 11B, the disengagement of trigger catch member tongue ledge end 179 from tongue ledge 155 causes trigger catch member tongue 178 to then pivot downward around trigger catch member tongue pin 173 which causes trigger catch member notch end 176 to pivot upwardly. The upward movement of trigger catch member notch end 176 causes shell latching member 138 to disengage from notch 174. The disengagement of shell latching member 138 from notch 174 releases the tension created in spring 140 during opening of upper shell 130, allowing spring 140 to exert force to close upper shell 130 onto base 112 in a fast, violent motion, entrapping the pest that exerted the downward force on base spring trigger 116. Spike 169 can impale the pest for further restraint. The pest can then be moved to a more convenient location and released or discarded by prying open upper shell 130.

Figure 12A:
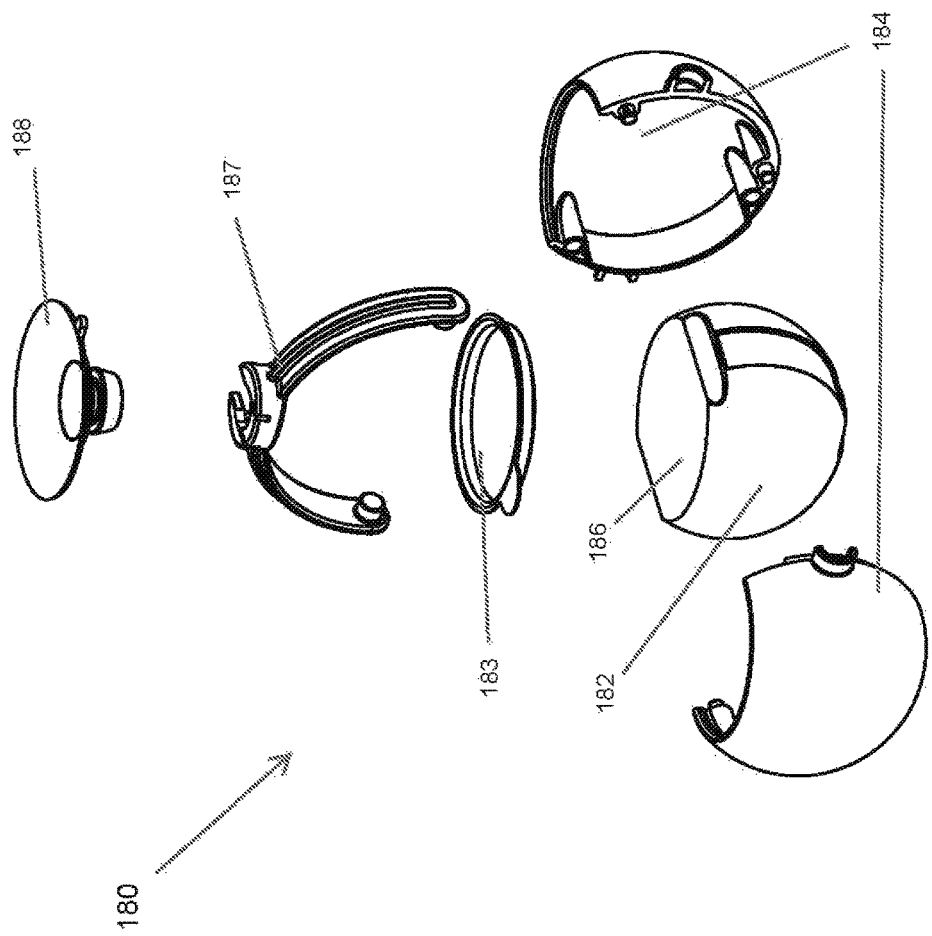
FIG. 12A presents an exploded view of a first embodiment of a gimbally mounted insecticide container.

FIG. 12A presents an exploded view of a first embodiment of a gimbally mounted insecticide container 180 configured to contain a predetermined quantity of nontoxic insecticide and mounted so that gimbally mounted insecticide container 180 maintains a substantially upright position independent of the motion of mounting surface.

Those skilled in the art can appreciate that gimbally mounted insecticide container 180 can be weighted on one end to assist in its upright stabilization. Also, a full gamut of solid, powder, or liquid insecticides can be dispersed into inner container 182 of gimbally mounted insecticide container 180. The basic principle of retaining an upright position applies to all solid forms of nontoxic insecticide.

Gimbally mounted insecticide container 180 comprises inner container 182 for containing nontoxic insecticide. Gimbally mounted insecticide container 180 further comprises at least one external shell 184 for enclosing inner container 182. Gimbally mounted insecticide container 180 further comprises aperture 186 for allowing pests ingress and egress into inner container 182, wherein the pest engages nontoxic insecticide disposed inside inner chamber 182 of gimbally mounted insecticide container 180 and exits back to its nest where it dies shortly thereafter and additionally carries insecticide to its nest to kill others in the nest. Gimbally mounted insecticide container 180 comprises a removable cap 183 that can be used to seal gimbally mounted insecticide container 180 and preserve insecticide. In one embodiment, a wire mesh filter (not shown) covers aperture 186. However, the holes between the weaves of the wire mesh filter can be close enough so that nontoxic insecticide does not disperse outside of aperture 186, and water or contaminants cannot enter into inner container 182. Gimbally mounted insecticide container 180 also has attached to it hinge 187 for rotatably supporting gimbally mounted insecticide container 180. Gimbally mounted insecticide container 180 further comprises attaching member 188 for attaching gimbally mounted insecticide container 180 to mounting surface 280. The mounting surface may be located above gimbally mounted insecticide container 180, or the mounting surface may be disposed at any angle to gimbally mounted insecticide container 180. For example, the mounting surface may be located below gimbally mounted insecticide container 180 such as a countertop. Alternatively, the mounting surface may comprise a wall to which gimbally mounted insecticide container 180 is attached. In one embodiment, attaching member 188 comprises a suction cup. Attaching member 188 can comprise any other method to attach gimbally mounted insecticide container 180 to the mounting surface, including screws; hook and loop fasteners; magnets; or any other mounting method now know or later developed.

Figure 12B:
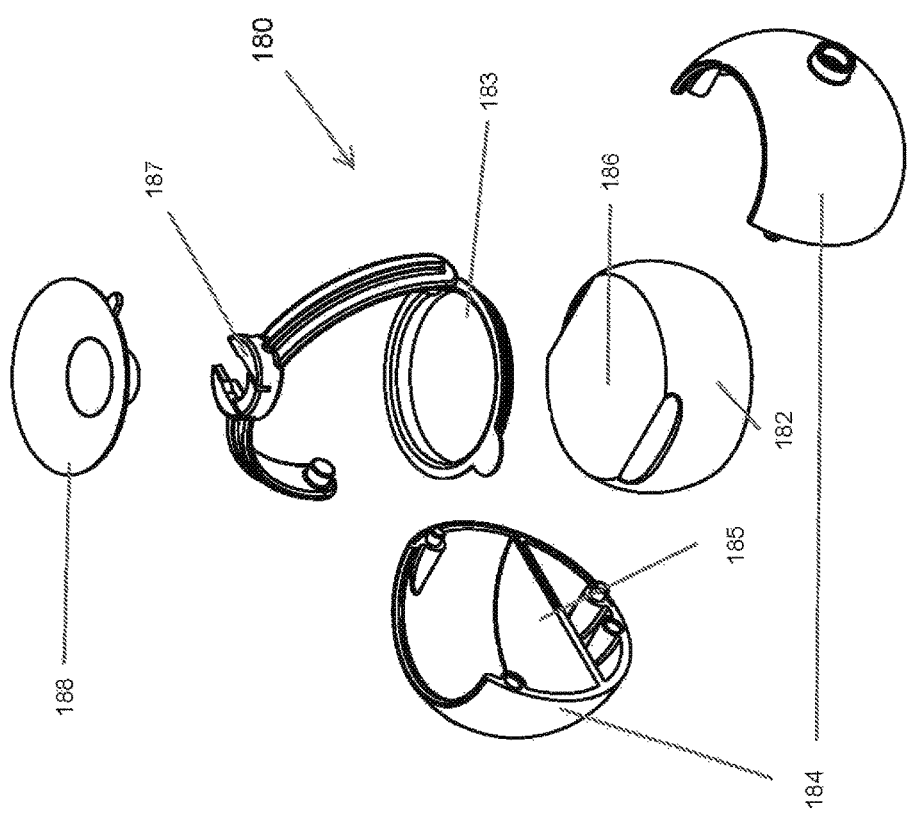
FIG. 12B presents an exploded view of a second embodiment of a gimbally mounted insecticide container.

FIG. 12B presents an exploded view of a second embodiment of a gimbally mounted insecticide container 180. In this embodiment, gimbally mounted insecticide container 180 further comprises shelf 185 in inner container 182 which reduces the volume of nontoxic insecticide that gimbally mounted insecticide container 180 can hold.

Figure 13:
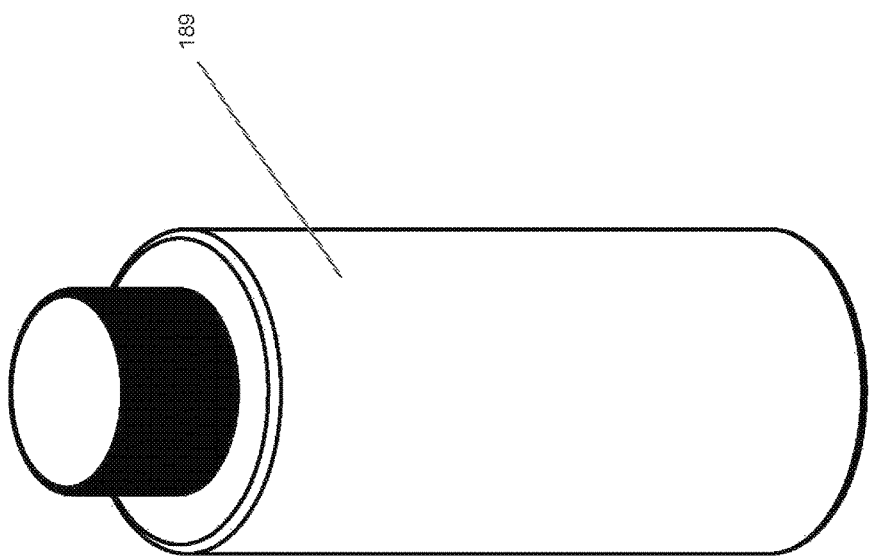
FIG. 13 presents a perspective view of a nontoxic insect repellant delivery device represented as a bottle of insecticide spray.

FIG. 13 presents a perspective view of a container 189 of nontoxic insecticide suitable for filling and refilling the gimbally mounted insecticide container.

Figure 14:
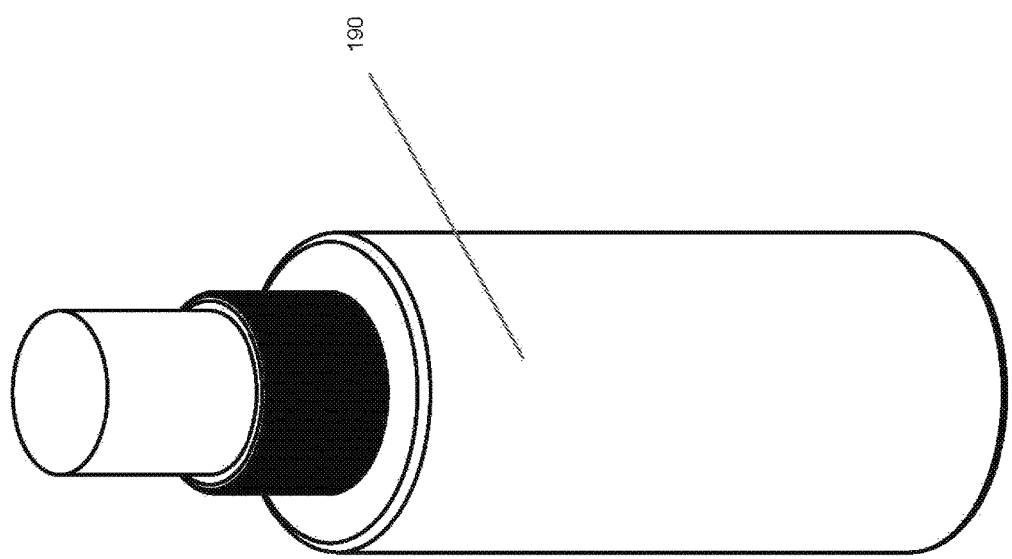
FIG. 14 presents a perspective view of a container of nontoxic insecticide suitable for filling and refilling the gimbally mounted insecticide container.
Figure 15:
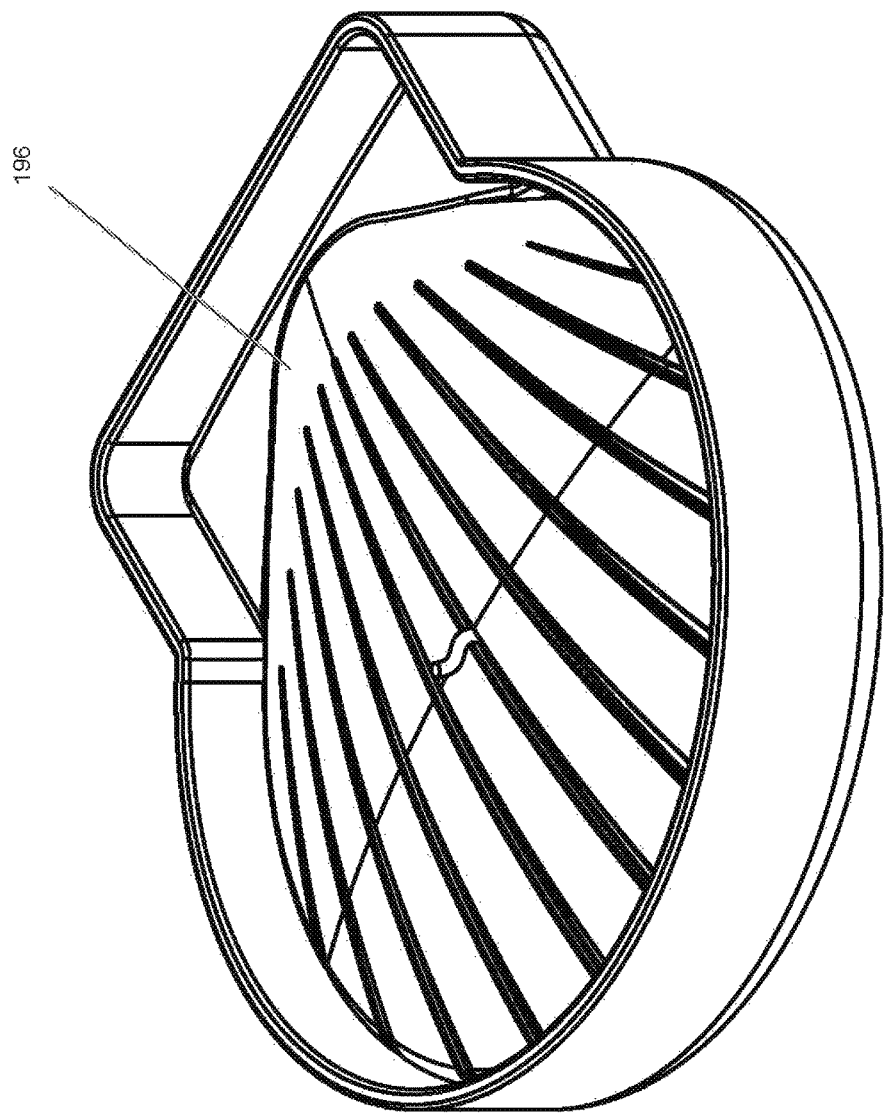
FIG. 15 presents an elevated side view of a nontoxic insect repellant solid composition represented as a citronella candle.

FIG. 14 presents a perspective view of nontoxic insect repellant delivery device 190 represented as a bottle of insecticide spray that may comprise a spray bottle capable of dispersing nontoxic insect repellant. In one embodiment, delivery device 190 utilizes an aerosol propellant. In some embodiments, nontoxic insect repellant delivery device 190 sprays a nontoxic insect repellant such as neem oil, nontoxic DEET, and the like. FIG. 15 presents an elevated side view of nontoxic insect repellant solid composition 196 represented as a citronella candle that can be utilized for repelling pests In some embodiments, nontoxic insect repellant solid composition 196 can be activated by thermal exposure, such as a citronella candle activated by lighting the candle's wick. An eclectic variety of salt and oils can be included that disperse a vapor or gas that repels pests such as mosquitoes and flies. Furthermore each exterior pouch provides storage for useful articles such as sanitation gel to clean hands after contacting pests, and paper towels to wipe chemicals from surfaces.

Figure 16:
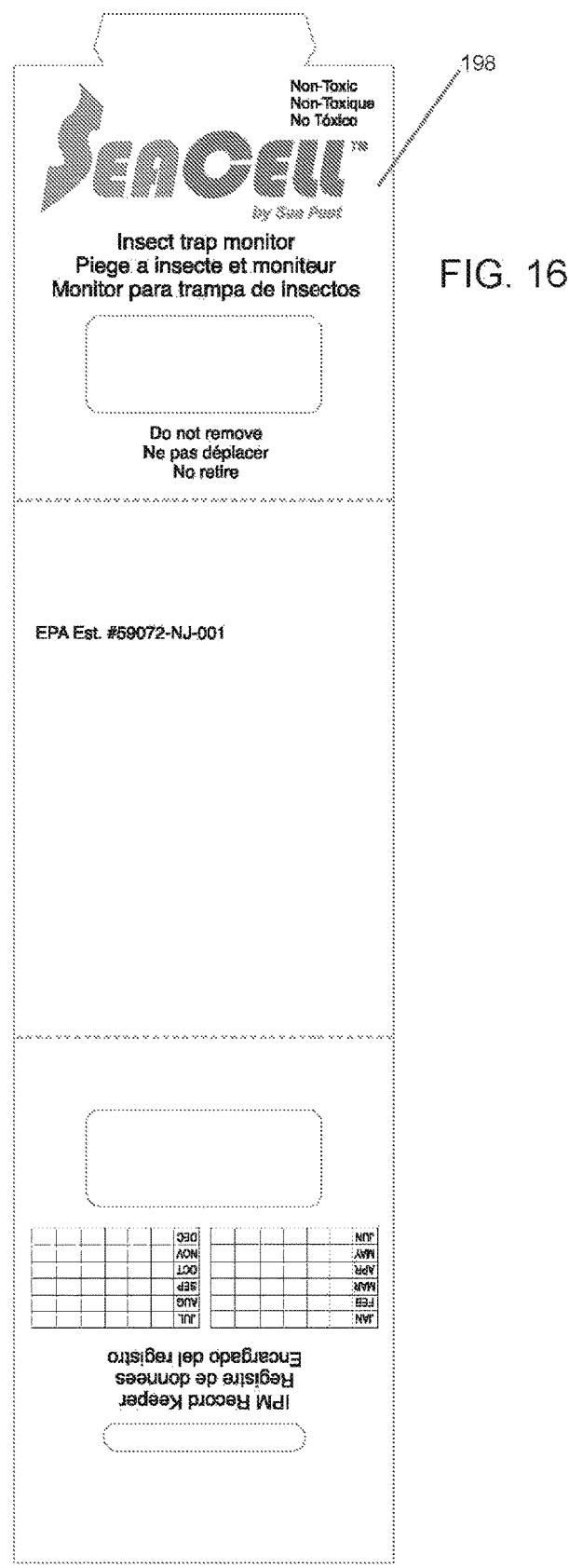
FIG. 16 presents an overhead view of an unassembled insect glue traps.

Additionally, static devices may be included in the ecofriendly maritime pest management kit. For example, FIG. 16 depicts an overhead view of an unassembled insect glue traps 198 comprising a piece of cardboard, fiberboard, or plastic that is coated with a sticky adhesive that may be used assembled and used for catching insects in the adhesive. Used insect glue traps 198 can be discarded and replaced with fresh insect glue traps 198. Insect glue traps 198 can be stored in the ecofriendly maritime pest management kit in the form of a flat panel and assembled when desired for use.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What I claim is:

1. A mechanical entrapment device for entrapping a pest, the mechanical entrapment device comprising:
    a base, the base comprising at least one wall and an outer perimeter edge, wherein each at least one wall extends vertically from the outer perimeter edge of the base, the base further comprising a base spring trigger,
    an upper shell, the upper shell pivotally mounted to the base, the upper shell defined by a shell front end for engaging with the at least one wall, a shell rear end, an inner surface and an exterior surface, the upper shell further comprising a shell latching member extending from the shell rear end, wherein the base and the upper shell define an interior of the mechanical entrapment device,
    a spring coiled around an upper shell pin, wherein each end of the spring is connected to the upper shell, wherein the spring exerts a force on the upper shell causing the upper shell to close upon the base,
    a tongue disposed on the base by a tongue support structure, the tongue having a tongue bait end and a tongue support end, wherein the tongue is pivotally mounted on the upper shell pin, the tongue support structure comprising a channel through which the upper shell pin passes, the tongue further comprising a tongue longitudinal aperture and a tongue ledge disposed at one end of the tongue longitudinal aperture, the tongue further comprising a wide section at the tongue bait end that terminates into a narrow section toward the tongue support end, wherein the tongue bait end is positioned above the base spring trigger, the tongue comprising a first aperture disposed on the wide section of the tongue bait end, wherein the first aperture is fixedly disposed above the base spring trigger,
    a pair of rails disposed in a parallel configuration on the tongue substantially parallel to the tongue longitudinal aperture, a bait holder, the bait holder extending along a longitudinal axis of the base, wherein the longitudinal axis of the base is parallel to the tongue longitudinal aperture, and slidably engaged within the rails, the bait holder defined by a bait end, the bait holder further defined by a bait holder support end, the bait holder further comprising a bait holder longitudinal aperture substantially aligned with the tongue longitudinal aperture, the bait holder comprising a narrow section at the bait end that terminates into a wide section toward the bait holder support end, wherein the wide section of the bait holder is substantially equivalent in width to a distance between the rails and the narrow section of the bait holder is substantially narrower in width than the distance between the rails, wherein the bait holder can be detached from the mechanical entrapment device when the narrow section of the bait holder is positioned between the rails, wherein further the bait holder cannot be detached from the mechanical entrapment device when the wide section of the bait holder is positioned between the rails, wherein the bait end of the bait holder comprises a significantly concave shape configured for receiving a predetermined quantity of bait, wherein the bait end of the bait holder mates with the first aperture of the tongue bait end above the base spring trigger when the bait holder is fully slidably inserted into the mechanical entrapment device, a trigger catch member comprising a trigger catch member notch end and a trigger catch member tongue end, a notch disposed at the trigger catch member notch end for securing the shell latching member when the upper shell is pivoted around the upper shell pin to an open position, wherein when the upper shell is pivoted into the open position the shell latching member travels to securely engage with the notch in the trigger catch member notch end, causing the trigger catch member tongue end to pivot upward between the tongue longitudinal aperture and the bait holder longitudinal aperture to position on top of the tongue ledge, whereby a downward force exerted by the trigger tongue end when it is disposed onto the tongue ledge causes a downward force on the tongue support end, causing the tongue bait end and the bait holder bait end to both pivot upwardly, causing the base spring trigger to extend into a locked position, wherein when a pest is entrapped in the interior of the mechanical entrapment device, the weight of the pest as it consumes bait disposed in the bait end of the bait holder exerts a downward force on the tongue bait end, causing the trigger catch member tongue end to pivotally lift above and release from the tongue ledge, causing the trigger catch member notch end to disengage from the shell latching member, causing the spring to release stored energy and pivot the upper shell to a closed position onto the base, forming a cavity between the upper shell and the base that traps the pest within the interior of the mechanical entrapment device.

2. The mechanical entrapment device of claim 1, wherein the mechanical entrapment device is configured to resemble a shark.

3. The mechanical entrapment device of claim 2, wherein the bait comprises peanut butter.

4. The mechanical entrapment device of claim 2, further comprising a tie-down post molded as part of the base configured to attach the mechanical entrapment device to a fixture.

5. The mechanical entrapment device of claim 2, further comprising a plurality of screw mounts drilled through the base configured to secure the base to a ground surface.

6. The mechanical entrapment device of claim 2, further comprising a spike disposed on the top inner surface of the upper shell positioned substantially above the base trigger spring when the mechanical entrapment device is in its closed position.

* * * * *